US012488033B2

(12) United States Patent
Vemulapalli et al.

(10) Patent No.: US 12,488,033 B2
(45) Date of Patent: Dec. 2, 2025

(54) PROCESSING TIME SERIES AND SPATIOTEMPORAL DATA IN DOCUMENT DATABASES

(71) Applicant: Couchbase, Inc., Santa Clara, CA (US)

(72) Inventors: Sitaram Vemulapalli, San Jose, CA (US); Samskrith Keshav Raghav, Union City, CA (US); Raghupathi Keshava Murthy, Union City, CA (US)

(73) Assignee: Couchbase, Inc., Santa Clara, CA (US)

( * ) Notice: Subject to any disclaimer, the term of this patent is extended or adjusted under 35 U.S.C. 154(b) by 0 days.

(21) Appl. No.: 18/634,472

(22) Filed: Apr. 12, 2024

(65) Prior Publication Data

US 2024/0346057 A1  Oct. 17, 2024

Related U.S. Application Data

(60) Provisional application No. 63/458,890, filed on Apr. 12, 2023.

(51) Int. Cl.
*G06F 16/33* (2025.01)
*G06F 16/31* (2019.01)
*G06F 16/334* (2025.01)

(52) U.S. Cl.
CPC .......... *G06F 16/334* (2019.01); *G06F 16/313* (2019.01)

(58) Field of Classification Search
CPC ............... G06F 16/334; G06F 16/313
See application file for complete search history.

(56) References Cited

U.S. PATENT DOCUMENTS

| | | | |
|---|---|---|---|
| 11,853,317 B1* | 12/2023 | Goyal | G06F 16/2477 |
| 2019/0171737 A1* | 6/2019 | Duan | G06F 16/2264 |
| 2021/0157811 A1* | 5/2021 | Wang | G06F 16/2477 |
| 2023/0037619 A1 | 2/2023 | Terlecki et al. | |

(Continued)

FOREIGN PATENT DOCUMENTS

CN        113656397 A    11/2021

OTHER PUBLICATIONS

PCT International Search Report and Written Opinion, PCT Application No. PCT/US2024/024345, Jul. 3, 2024, 148 pages.

(Continued)

*Primary Examiner* — Loc Tran
(74) *Attorney, Agent, or Firm* — Fenwick & West LLP

(57) ABSTRACT

A system manages time series data stored in association with documents. The system stores a time series in multiple documents. The time series data includes a series of data points indexed in time order, and each document stores a subset of the series of data points. Each document stores metadata about a time range of the subset of series of data points. The system indexes the documents based on their time ranges. The system may be used for storing and querying spatiotemporal data. Accordingly, each document further stores spatial data and metadata representing a spatial range of geohashes. Responsive to receiving a query for one or more data points, the system selects one or more documents from the multiple documents that contain data points in the particular spatial and time range based on the indexes. The system performs the query on the data points.

18 Claims, 7 Drawing Sheets

(56) References Cited

U.S. PATENT DOCUMENTS

2023/0401211 A1\* 12/2023 Belloni .................. G06F 16/93
2024/0256531 A1\*  8/2024 Grund .................. G06F 21/602

OTHER PUBLICATIONS

Xue Jin et al: "TagTree: Global Tagging Index with Efficient Querying for Time Series Databases", IEEE International Parallel and Distributed Processing Symposium (IPDPS), IEEE, May 30, 2022, pp. 1283-1293.

\* cited by examiner

300

```
┌─────────────────────────────────────────────────────────────────┐
│ Store a time series in a plurality of documents, the time series │
│ comprising a series of data points indexed in time order, and    │
│ each of the plurality of documents stores a subset of the series │
│ of data points in time order                                     │
│                              310                                 │
└─────────────────────────────────────────────────────────────────┘
                                │
                                ▼
┌─────────────────────────────────────────────────────────────────┐
│ For each of the plurality of documents, store, as metadata in the│
│ document, a time range of the subset of the series of data points│
│                              320                                 │
└─────────────────────────────────────────────────────────────────┘
                                │
                                ▼
┌─────────────────────────────────────────────────────────────────┐
│ Index the plurality of documents based on their corresponding    │
│ time ranges                                                      │
│                              330                                 │
└─────────────────────────────────────────────────────────────────┘
                                │
                                ▼
┌─────────────────────────────────────────────────────────────────┐
│ Receive a query associated with one or more data points in a     │
│ particular time range                                            │
│                              340                                 │
└─────────────────────────────────────────────────────────────────┘
                                │
                                ▼
┌─────────────────────────────────────────────────────────────────┐
│ Select, based on the index, one or more documents from the       │
│ plurality of documents that contain data points in the particular│
│ time range                                                       │
│                              350                                 │
└─────────────────────────────────────────────────────────────────┘
                                │
                                ▼
┌─────────────────────────────────────────────────────────────────┐
│ Extract data points in the particular time range from the        │
│ selected one or more documents                                   │
│                              360                                 │
└─────────────────────────────────────────────────────────────────┘
                                │
                                ▼
┌─────────────────────────────────────────────────────────────────┐
│ Perform the query on the extracted data points                   │
│                              370                                 │
└─────────────────────────────────────────────────────────────────┘
```

| | | | |
|---|---|---|---|
| v | t | m | j |
| u | s | k | h |
| g | e | 7 | 5 |
| f | d | 6 | 4 |
| c | 9 | 3 | 1 |
| b | 8 | 2 | 0 |

(410, with 415 highlighting 't'; top row: z, x, r, p; second row: y, w, q, n)

Expanded view (420):

| tp | tr | tx | tz |
| tn | tq | tw | ty |
| tj | tm | tt | tv |
| th | tk | ts | tu |
| t5 | t7 | te | tg |
| t4 | t6 | td | tf |
| t1 | t3 | t9 | tc |
| t0 | t2 | t8 | tb |

PROCESSING TIME SERIES AND SPATIOTEMPORAL DATA IN DOCUMENT DATABASES

CROSS-REFERENCE TO RELATED APPLICATIONS

This application claims the benefit of and priority to U.S. Provisional Application No. 63/458,890, filed Apr. 12, 2023, which is incorporated by reference herein in its entirety.

BACKGROUND

Field of Art

This disclosure relates in general to document databases, and in particular to storing and processing time series data in document databases.

Description of the Related Art

Time series data is any data changing over time. In the case of data management, it often refers to data collected frequently, in regular or irregular intervals, from one or more devices or from one or more processes. For example, time series data is typically numerical and changes incrementally. A time series database may store and manage very large volumes of time-series data. Such a database is particularly useful for applications that require storage and analysis of data that changes over time, such as sensor data, log data, and so on. Time-series data may be received periodically on a continuous basis from multiple sources and may accumulate over time as very large amount of data. For example, each sensor may send data every few seconds. Due to the volume of the time series data, storing and querying such data can be inefficient.

SUMMARY

The embodiments described herein include a system that stores a time series in a plurality of documents, each document storing an array of data points of the time series along with metadata representing a time range of the data points stored in the document. The time range for a document is represented using a low value representing the start of the time range, and a high value representing the end of the time range. Accordingly, each of the plurality of documents stores a subset of the series of data points in time order. The system indexes the plurality of documents based on their corresponding time ranges. Responsive to receiving a query associated with one or more data points in a particular time range, the system selects, based on the index, one or more documents from the plurality of documents that contain data points in the particular time range, extracts data points in the particular time range from the selected one or more documents, and performs the query on the extracted data points.

According to an embodiment, each of the plurality of documents further stores spatial data as part of the array attribute, and metadata including a spatial range of geohashes for the data points stored in the document, the spatial range stored as (1) a lower geohash value representing a start of the spatial range, and (2) an upper geohash value describing an end of the spatial range. The spatial range and time range associated with each document allow the documents to be indexed for searching using both spatial constraints and temporal constraints specified in queries.

According to an embodiment, the query further specifies a spatial constraint that filters the data points by a spatial range, the spatial range specified using a start geohash value and an end geohash value, wherein the one or more documents selected based on the index contain data points within the spatial range.

BRIEF DESCRIPTION OF THE DRAWINGS

FIG. 3 is a flowchart of one embodiment of a method for retrieving items for a query using an embedding for the query, item embeddings, and one or more attributes of the items.

FIG. 4 illustrates the use of geohash to represent a spatial region, according to an embodiment.

Figure 1:
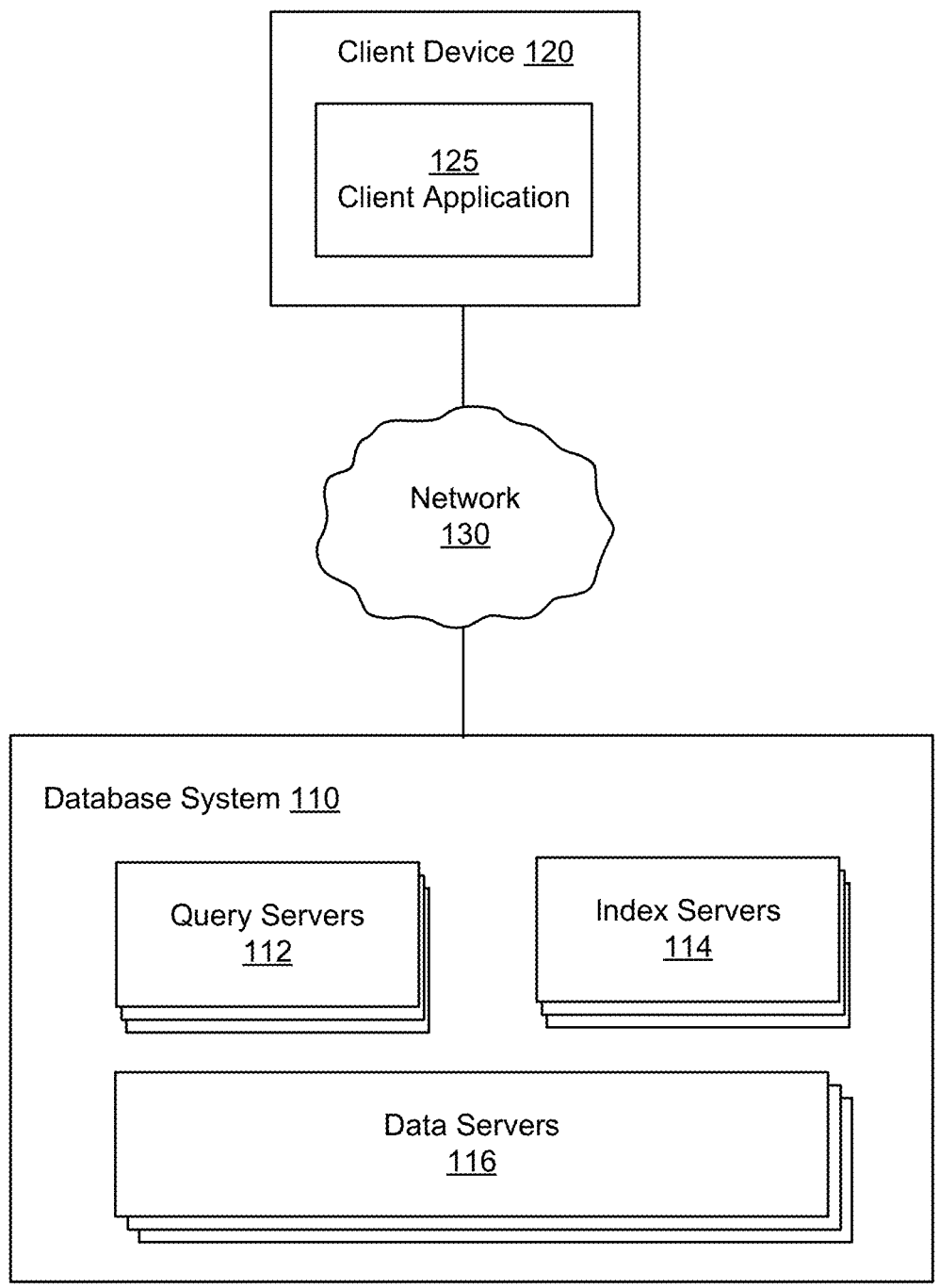
FIG. 1 is an embodiment of a block diagram of a distributed database system environment for managing time series document databases.

The figures depict embodiments of the present disclosure for purposes of illustration only. One skilled in the art will readily recognize from the following description that alternative embodiments of the structures and methods illustrated herein may be employed without departing from the principles, or benefits disclosed, of the disclosure described herein.

DETAILED DESCRIPTION

System Overview

A document database stores documents, e.g., as JSON objects. A document database can be used to store time series data. In the time series document database, data is organized into collections of documents, with each document representing a data record at a specific time period. Traditionally, each data point is stored as a JSON object, including multiple fields. The multiple fields include at least a time field and a value field, where the time field corresponds to a time, and the value field corresponds to a value detected at the time. In a traditional time series document database management, each data point is indexed by an index server.

According to an embodiment, a time series document database stores time series data as arrays. Accordingly, each document may store a plurality of time series data points in a single attribute that stores arrays. Accordingly, a single key-value pair is able to store multiple time series data points. As a result, the document database according to an embodiment, stores time series data efficiently. Such a time series document database stores and manage large volumes of time-series data in the form of documents.

The time series document database is useful for applications that require the storage and analysis of data that changes over time, such as sensor data, data generated by instrumented software, log data, and so on. A time series document database is able to handle large volumes of data efficiently and is able to scale horizontally by distributing data across multiple nodes.

In a time series document database, data points are stored as JSON (JavaScript Object Notation) objects, which use a lightweight and flexible data format that can be easily parsed and manipulated. Such a time series document database provides a range of querying and indexing capabilities that enable efficient retrieval and processing of time series data based on time and other criteria.

Overall, time series document databases offer a powerful and flexible solution for managing and analyzing time-stamped data, which are important in a wide range of industries and applications.

Following is an example of time series data stored in a traditional time series document.

"stock:BASE:d1" {"ticker": "BASE", "time": "2021-10-02T10:10:30Z", "value": 32.34}
"stock:BASE:d2" {"ticker": "BASE", "time": "2021-10-02T10:10:50Z", "value": 32.54}
"stock:BASE:d3" {"ticker": "BASE", "time": "2021-10-02T10:11:23Z", "value": 33.34}
"stock:BASE:d4" {"ticker": "BASE", "time": "2021-10-02T10:12:38Z", "value": 34.92}
"stock:BASE:d5" {"ticker": "BASE", "time": "2021-10-02T10:12:53Z", "value": 33.82}
"stock:BASE:d6" {"ticker": "BASE", "time": "2021-10-02T10:13:30Z", "value": 32.89}

As shown in the example, each line of the document is a JSON object that represents a time series data point. Each JSON object has three fields, namely "ticker", "time", and "value", and each field corresponds to a value. For example, "ticker" field corresponds to a value of "BASE," "time" field corresponds to a value of time in ISO format, and "value" field corresponds to a number with 2 decimal places.

Unlike transactional data that often requires an action by an entity to generate the transaction, time series data is generated even when nobody is doing anything. For example, the time series data may represent power usage from a smart meter or temperature of a vehicle that is constantly generated independent of the spatial location. Thus, time series data is voluminous. As time series data volume grows, indexing, ingestion, storage, and processing cost increases.

To reduce the indexing, ingestion, storage, and/or processing cost of time series data, the embodiments described herein introduce a novel method or system for storing regular and irregular time series data. The system stores a time series in a plurality of documents. The time series includes a series of data points indexed in time order. Each of the plurality of documents stores a subset of the series of data points in time order. For each of the plurality of documents, the system stores as metadata in the document, a time range of the subset of the series of data points stored in the document.

In some embodiments, the time range of each subset of series of data points is stored as (1) a time start field describing a start time of the subset of series of data points, and (2) a time end field describing an end time of the subset of series of data points. In some embodiments, when a new data point is received, the new data point is appended to a last data point in a last document in the plurality of documents, and the time end field of the last document is updated based on the appended new data point.

The system indexes the plurality of documents based on their corresponding time ranges. Responsive to receiving a query associated with one or more data points in a particular time range, the system selects, based on the index, one or more documents from the plurality of documents that contain data points in the particular time range, extracts data points in the particular time range from the selected one or more documents, and performs the query on the extracted data points. In some embodiments, the data points in each document are stored in an array. The extracting of the data points in the particular time range includes unnesting the data points from the array.

In some embodiments, each of the plurality of documents includes a maximum size. When a size of a last document reaches the maximum size, a new document is generated, and incoming data points are stored in the new document until the new document reaches the maximum size. This process repeats as long as applicable. Alternatively, or in addition, each document is set to store data points in a predetermined period, such as a number of days, a number of months. In such a case, when the predetermined time period passes, a new document is generated. Alternatively, or in addition, the number of data points stored in each document may be determined based on queries that are commonly received. For example, if common queries are associated with a time range of a day, each time series documents may be configured to store a few days of time series data points; if common queries are associated with a time range of a week, each time series documents may be configured to store a few weeks of time series data points.

In some embodiments, the time stamp of each data point is stored as an integer with a predetermined length. Alternatively, or in addition, the time stamp field name and/or value field name of each data point are omitted. Storing time stamps as integers and/or omitting field names significantly reduces the storage required for storing time series data points.

Although the techniques are disclosed herein in the context of document databases, the techniques can be used in other document stores, for example, for indexing and searching through time series or spatiotemporal data stored in files (say in S3 storage of Amazon Web Services (AWS) or other type of cloud storage or other storage systems.) In these embodiments, the index simply points to the files stored in a storage system. Since timeseries data is quite large, the system can simply store the data in a storage system such as S3 and avoids the loading of the data until its analysis is required.

Example Documents Storing Time Series Data

A few example novel time series documents are described, in accordance with one or more embodiments. For example, following is an example time series document, in accordance with one embodiment.

```
docid: "stock:BASE :d1"
{
  "ts_data": [
    ["time": "2021-10-02T10:10:30Z" ,"value": 32.34],
    ["time": "2021-10-02T10:10:50Z" ,"value": 32.54],
    ["time": "2021-10-02T10:11:23Z" ,"value": 33.34],
    ["time": "2021-10-02T10:12:38Z" ,"value": 34.92],
```

```
    ["time": "2021-10-02T10:12:53Z" ,"value": 33.82],
    ["time": "2021-10-02T10:13:30Z" ,"value": 32.89],...
  ]
  "ts_start" : "2021-10-02T10:10:30Z",
  "ts_end": "2021-10-05T10:00:00Z", /* introduce a time range ts_start, ts_end fields */
  "foo": {"ipodate": "2021-07-22", "address"; " ... "},
  "ticker": "BASE"
}
```

This document is a single JSON object. The JSON object includes multiple fields, namely "ts_data", "ts_start", "ts_end", "info", and "ticker." The time series data points are stored in the field "ts_data" as an array. Each element in "ts_data" array is a subarray that records the elements of each time series datapoint, such as a time element and a value element.

The rest of the fields are used to record metadata about the time series data points recorded in "ts_data" array. For example, fields "ts_start" and "ts_end" record the start time and end time of all the time series data points stored in "ts_data." Field "info" and "ticker" are both used to record information that is common to all the time series data points recorded in "ts_data" array.

Notably, unlike the traditional time series document, in which the ticker field and corresponding value are repeatedly recorded in each JSON object, the time series document 200A only needs to record the ticker field and its value once. As such, the storage required for storing the time series data points is significantly reduced.

Following is another example time series document, in accordance with one embodiment.

```
docid: "stock:BASE :dl"
{
  "ts_data": [
    ["time": 1634942482948, "value": 32.34],
    ["time": 1634943429481, "value": 32.54],
    ["time": 1634944828723, "value": 33.34],
    ["time": 1634945827232, "value": 34.92],
    ["time": 1634946283721, "value": 33.82],
    ["time": 1634947359421, "value": 32.89],
    ...
  ]
  "ts_start" : 1634942482948,
  "ts_end": 1634982892948, /* introduce a time range ts_start, ts_end fields */
  "foo": {"ipodate": "2021-07-22", "address"; " ... "},
  "ticker": "BASE"
}
```

As illustrated, each time value for each data point is now recorded by an integer of a predetermined length, which further saves the storage for storing the time values of each data point. The minimum unit for a time value difference is one or more millisecond. For example, a few milliseconds as an integer may be implemented. However, nano seconds are not feasible because the value does not fit in an integer after the year 2037 to do computation on EPOCH time. An epoch represents a cutoff point of historical data within the database. When date time conversion is performed, the milliseconds can be converted using date time functions.

Following is another example time series document, in accordance with one embodiment.

```
docid: "stock:BASE :dl"
{
  "ts_data": [
    [1634942482948, 32.34],
    [1634943429481, 32.54],
    [1634944828723, 33.34],
    [1634945827232, 34.92],
    [1634946283721, 33.82],
    [1634947359421, 32.89],
    ...
  ]
```

-continued

```
"ts_start" : 1634942482948,
"ts_end": 1634982892948, /* introduce a time range ts_start, ts_end fields */
"foo": {"ipodate": "2021-07-22", "address"; " ... "},
"ticker": "BASE"
}
```

As illustrated in this example, the time series data is now recorded as an array of a plurality of subarrays. Each subarray records only a value of the time element, and a value of the value element, i.e., the element names (e.g., "time" and "value") are omitted, which further saves the storage for storing the time series data points.

Time series data points may be collected in regular or irregular intervals. The regular time series may be stored in a data format without the time values, which can further save storage.

Following is an example time series document for storing irregular time series data points.

```
{
    "ts_data": [ [_t, _v0, _v1 , ... ], [_t, _v0, _v1, ... ] ... ],
    "ts_start":1677730930000,
    "ts_end" :1677730939000,
    "ts_interval ": 0.,
    "ticker " : "BASE"
}
```

In this example, each time series data point in "ts_data" array includes a time element _t, representing time values. For an irregular time series, the time value may be random, and cannot be predicted. Thus, the time values are required to be recorded in the time series document.

Following is an example time series document for storing regular time series data points, in accordance with one or more embodiments.

```
{
    "ts_data": [ [ _v0, _v1 , ... ], [_ _v0, _v1, ... ] ... ],
    "ts_start":1677730930000,
    "ts_end" :1677730939000,
    "ts_interval ": 0.,
    "ticker " : "BASE"
}
```

In this example, each time series data point in "ts_data" array does not include a time element. For a regular time series, the time value is incremental in a predetermined interval. Thus, as long as the start time is known, and the time interval is known, the time element can be omitted from the time series document. In this example, the field "ts_interval" with value 1000 represents that the time interval is 1000 ms. Since the start time is known, the time value can be reconstructed. Notably, not having to store time values, less storage space is required to store the time series data points.

The time series documents described above are merely a few examples of embodiments. Other variations may also be implemented. Users have the flexibility of field names and locations (nested) in the document. Users also have the option to specify the path of the fields. For an irregular time series, time element_t is generally mandatory. For a regular time series, time element_t may be omitted, as long as the time interval is included as a field in the document.

In regular time series, the time elements _t can be duplicated. In irregular time series, time elements _t will be unique. The value elements _v0, _v1, . . . may be values or a JSON object. In some embodiments, the "ts_data" array is position dependent, e.g., MISSING is not allowed. If one is missing, it is converted into NULL. Field ts_start is start time of time series data in the document, field ts_end is the end time of time series data in the document. The fields ts_start and ts_end are used to select documents. For example, if the documents are stored by month, an end of month EPOCH time can be given even when actual data has only the first 2 days.

In some embodiments, each document must have fields ts_data, ts_start, ts_end and mandatory ts_interval for regular time series. If the fields are not specified, that document may get filtered out.

In some embodiments, fields_t, ts_start, ts_end, ts_interval must be integers (i.e., EPOCH time). If not, those documents or data points are considered filtered out. The minimum unit for a time value difference is one or more millisecond. A few milliseconds as an integer may be implemented. However, nano seconds will not be feasible because it will not fit in an integer after the year 2037 to do computation on EPOCH time. When date time conversion is performed, the milliseconds can be converted using date time functions.

Compared to ISO time format strings, significant improvement can be achieved by recording time in integer format. In particular, the recording of time value in integer format reduces both computation and storage usage by half.

In some embodiments, a document can be 20 MB. The greater the document size, the fewer number of documents will be generated. As such, there will be fewer documents to process, less KV gets, smaller indexes, and less DCP streams. Further, expiration of older documents is thousands or millions versus gillions in existing databases. On the other hand, smaller documents means the front of index will be purged on expiration that heavily impacts index maintenance and scans will be very slow.

Fields ts_start, ts_end, and ts_data maintenance can be performed as follows. As the start of document creation, ts_start and ts_interval (for regular time series) can be added to the document, and ts_end may be set as MAXINT64. As new data point comes, the system can append new data point at the end of the ts_data array. At the same time, ts_end may be updated based on the appended new data point.

If data load is performed, and data need to be in sync, a database query UPDATE statement can be used. Below is an example code for using UPDATE statement.

```
UPDATE mycollection AS m
    SET m.ts_end = CASE WHEN m.ts_interval > 0
        THEN m.ts_start +
    (m.ts_interval*ARRAY_LENGTH(m.ts_data))
    ELSE m.ts_data[-1][0] END
```

As ts_data is large, this field should be kept after more commonly used fields in the document for faster access.

If query ranges are days, it is advantageous to store data points for days in each document. If query ranges are hours then it is advantageous to store data points for hours in each document, so that whole day data does not have to be iterated.

In some embodiments, TIME SERIES can be reserved as a keyword, and _timeseries( ) function is used to query time series documents.

An example time series document is shown below.

```
{
"ts_data": [
    [1677730930000, 16.30],
    [1677730939000, 16.31]],
    ...
    ]
"ts_start": 1677730930000,
"ts_end": 1677730939000,
"ts_interval": 0,
"ticker": "BASE"
}
```

Example code that use_timeseries( ) function is shown below.

```
\set -$ts_ranges [1677730933000, 1677730939000];
SELECT t.* FROM default AS d
UNNEST _timeseries(d, {
    "ts_data":"ts_data", // path to time series data in document
    "ts_interval":"ts_interval", // path to intrvl in document
    "ts_start":"ts_start", // path to document start
    "ts_end": "ts_end", // path to document end
    "ts_keep": false,
    "ts_ranges":$ts_ranges, // time series predicate ranges
    "ts_project": 0 // project value from data point
}
) AS t
WHERE d.ticker = 'BASE' AND (d.ts_start <= $ts_ranges[1] AND d.ts_end >= $ts_ranges[0]);
```

Fields ts_data, ts_interval, ts_start, ts_end are optional in the second argument of _timeseries( ) function. If missing, the function uses the same field in the document. The second argument is evaluated once per query to generate two lists of expressions, one based on document, the other based on static. Evaluation of document expressions is based on the document. Fields ts_data, ts_start, ts_end, ts_interval values prefix alias+ ".".

In the time series documents described herein, a time range of the time series data points is recorded as metadata. For example, "ts_start" and "ts_end" fields are used to record a start time and end time of the time series data points. With this time range information, the time series documents can be indexed.

Sample database query using TIME SERIES as keyword is shown below.

```
SELECT t.* FROM default AS d
UNNEST TIME SERIES [FOR] d <options> AS t
WHERE d.ticker = 'BASE' AND (t._t BETWEEN $ts_ranges[0][0] AND
$ts_ranges[0][1]
OR t._t BETWEEN $ts_ranges[1][0] AND $ts_ranges[1][1]);
```

FROM WHERE clause Time series alias predicate and OPTIONS generate new predicate for index selection.

The system adds the implicit ts_ranges to time series operator.

<option> can be used to specify a subset of fields. The fields not specified use default values.

In some embodiments, when specifying a field, a statement starts with a keyword. For example, a statement may include one or more of following clauses:
WITH <object>
OPTIONS <object>
WITH OPTIONS <object>

Other equivalent specifications may include clauses such as following.

[LEFT] UNNEST TIME SERIES [FOR] d <options> AS t

[LEFT] UNNEST LATERAL TIME SERIES [FOR] d <options> AS t

[LEFT] JOIN TIME SERIES [FOR] d <options> AS t ON true (1=1, etc)

[LEFT] JOIN LATERAL TIME SERIES [FOR] d <options> AS t ON true

COMMA TIME SERIES [FOR] d <options> AS t

COMMA LATERAL TIME SERIES [FOR] d <options> AS t.

Example code using <option> is shown below and includes fields such as start and end of the time range.

```
<options>:
[WITH] [OPTIONS] {
    "ts_data":"ts_data",
    "ts_interval":"ts_interval",
    "ts_start":"ts_start"
    "ts_end": "ts_end",
    "ts_keep": false
}
```

The <option> field is optional. If not specified, default field names are used (ts_data, ts_internal<ts_start, ts_end, ts_keep, ts_project).

Further, in some embodiments, the system may provide built-in functions, such as (but not limited to) data conversion, data enrichment, format conversion, dynamically generating separate time series objects with predefined field names. If used in UNNEST, the system may stream results for faster response and to reduce consumption of memory. In some embodiments, if _t is not in an EPOCH integer, the data point is ignored. Due to self JOIN and to keep memory usage low strips of timeline (due to large size), there is an option to keep timeline ("keep": true). If ts_ranges is present then OUTER UNNEST is considered as INNER as if those predicates applied in WHERE clause (NOTE: UNNEST there is not ON clause).

To reduce CPU/Memory consumption, clusters are sized appropriately.

Example code using_timeseries( ) function is shown below.

```
_timeseries(d,
    {"ts_data":"ts_data", // path to time series data in document, missing uses ts_data
    "ts_interval":"ts_interval", // path to interval in document, missing uses ts_interval
    "ts_start":"ts_start" // path to document start, missing uses ts_start
    "ts_end": "ts_end", // path to document end, missing uses ts_end
    "ts_keep": false, // missing uses false
    "ts_ranges":$ts_ranges, // time series predicate, missing no filter
    "ts_project": 1 // project values from datapoint number or array of numbers
    }
)
```

$ts_ranges [1677730943000, 1677730958000] are EPOCH time in integers, inclusive of both values. Both values should be present. If the bounds of the range are not inclusive, the range may be specified by increasing low value by 1 and decreasing high value by 1. If a user wants to specify a range with an unbounded low end value, the lower bound of the range may be specified as 0. If user wants to specify a range with an unbounded high end value, the user can use MaxInt64 as the value of the upper bound of the range.

Below is an example of format conversion of an irregular time series document.

```
timeline = [ [1677730930000, 16.30, {"x":1}, .....],
    [1677730931000, [16.31, 16.311]],
    .....
]
output : {"_t": 1677730930000, "_v0": 16.30, "_v1": {"x":1},....}
    {"_t": 1677730930000, "_v0": [16.31, 16.311] }
```

Below is an example of regular data conversion, where ts_interval, ts_start, ts_end are mandatory.

```
timeline = [ 16.30,
    [16.31, 16.311],
    {"v":[16.31, 16.311]},
    .....
]
output : {"_t": ts_start, "_v0": 16.30}
    {"_t": ts_start+1*ts_interval, "_v0": 16.31, "v1": 16.311}
    {"_t": ts_start+2*ts_interval, "_v0": {"v":[16.31, 16.311]}}
```

Index selection can be performed using the following code: CREATE INDEX ix1 ON ts.s1.c2 (ticker, ts_end, ts_start). The index created allows an internal query to first coarse select the specific documents to process and then perform a fine-grain filtering of each data point stored in the array within the document. The index is also flexible and allows overlapping ranges (for flexible data growth). Furthermore, since a large number of data points can be stored in each document, the number of documents used is drastically reduced compared to a system that stores each data point as a separate document. As a result, the generated index is also small since it is configured to allow searching through fewer documents. For typical time series data, the technique allows saving more than 90% of index storage and related resources.

A simple and lean index is chosen for the documents. In some embodiments, time series data points themselves are not indexed. This results in an index that is smaller and requires less storage. For example, the index has only millions of entries as opposed to significantly more number of entries (e.g., billions of entries) if all the data points were indexed. The expiration of documents has low impact on the index maintenance or index scan.

Document selection can be performed using the following predicate: (d.ts_start<=$ts_ranges[1] AND d.ts_end>=$ts_ranges [0])

These instructions cause the database system to push predicate exactly and perform index scan.

Multiple ranges of documents selection may be complex and not easy to understand. In some embodiments, each range can be repeated. Alternatively, covered inner join can be used to generate doc keys, and USE KEYS can be used in the main query.

System Architecture

FIG. 1 is an embodiment of a block diagram of a distributed database system environment 100 for managing time series document databases. In the embodiment shown, the system environment includes a database system 110, a client device 120, and a network 130. Other embodiments may use more or fewer or different systems than those illustrated in FIG. 1. Functions of various modules and systems described herein can be implemented by other modules or systems than those described herein.

The database system 110 manages one or more time series document databases. The database system 110 includes query servers 112, index servers 114, and data servers 116. The data servers 116 may include one or more nodes storing time series document databases. The index servers 114 are configured to index the time series documents based on their time ranges. The query servers 112 are configured to process queries from users or user-defined functions. The client device 120 may include a client application 125 configured to generate and transmit queries to the database system 110.

System Architecture

Figure 2:
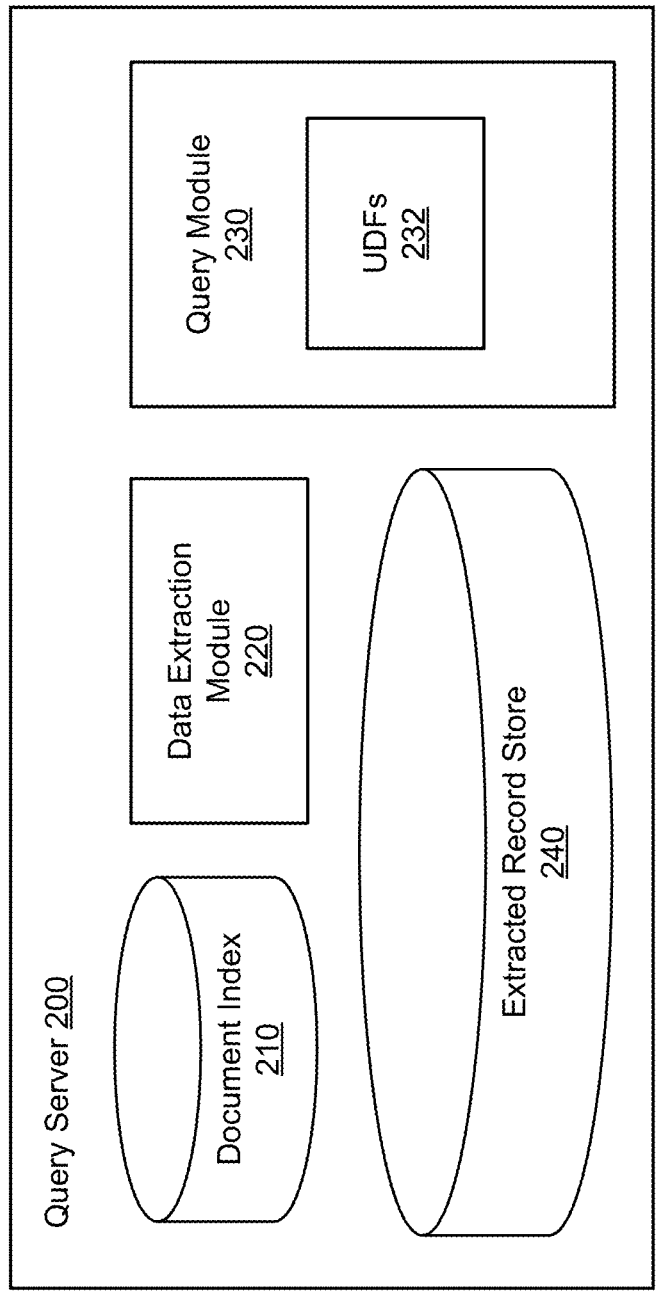
FIG. 2 illustrates an example architecture of the query server, according to an embodiment.

FIG. 2 illustrates an example architecture of the query server 200. The query server 200 includes document index 210 (generated by the index servers 114), an data extraction module 220, a query module 230, and an extracted record store 240. Responsive to receiving a query from the client application 125, the query servers 112 determine a time range associated with the query, and selects one or more time series documents in a database that contain data points in that particular time range based on the document index 210. The data extraction module 220 extracts data points in the particular time range from the selected time series documents, and stores the extracted data points in the extracted record store 240. In some embodiments, the time series data points are stored as elements in an array, and the extraction of the data points includes unnesting a subset of elements from the array. The query module 230 performs the query on the extracted data points. In some embodiments, the query module 230 also includes or has access to user defined functions (UDF) 232. The queries may be performed based on UDFs 232.

Following is an example code for performing a query.

```
\ set -$ts_ranges [ 1682947800000, 1685563200000] ;
CREATE INDEX ix1 ON docs(ticker, ts_end, ts_start);
SELECT t.* FROM docs AS d,
UNNEST _timeseries(d, { "t_ranges" :$ts_ranges} ) AS
WHERE d.ticker = BASE
AUD (d. s_start <= $ts_ranges[1] AND d.ts_end >= $ts_ranges[0])
```

As illustrated in this example, the code "\set-$ts_ranges [1677730943000, 1677730958000]" sets a range of data points that are to be queried. The code "CREATE INDEX ix1 ON docs (ticker, ts_end, ts_start)" filters the time series documents based on their time ranges. The code "SELECT t.*FROM docs AS d" selects all the time series data points from the filtered documents. The code "UNNEST_timeseries (d, {" ts_ranges ": $tranges}) AS t" unnests the selected time series datapoints and stores them in an array "t". The last two lines of code are part of the unnest command and specify a WHERE clause with a predicate (on ticker and time range) to specify the scope of the unnest command.

Following is another example code for performing a query to compute a day average on time series data points in a particular time range. The CREATE INDEX command creates an index on the time range and the SELECT query executes the_timeseries( ) user defined function to process data points within each document selected by the index.

example, as illustrated in examples above, each time series document includes a "ts_data" array that stores time series data, and a "ts_start" field recording a time of the first data point in the document, and a "ts_end" field recording a time of the last data point in the document.

The database system 110 indexes 330 the plurality of documents based on their corresponding time ranges. Unlike the traditional time series documents, each data point is indexed, which often results in gillions of data points, the indexing of the documents described herein would significantly reduce the number of indexes to thousands or millions.

The database system 110 receives 340 a query associated with one or more data points in a particular time range. The database system 110 selects 350, based on the index, one or more documents from the plurality of documents that contain data points in the particular time range. The database system 110 extracts 360 data points in the particular time range from the selected one or more documents. The database system 110 performs 370 the query on the extracted data points. For example, when time series data points are stored in an array (e.g., "ts_start" array), a subset of data can be extracted using UNNEST function, which unnests a subset of elements of the array.

Spatiotemporal Data Indexing and Querying

According to various embodiments, the system stores spatiotemporal data in the document database, creates indexes based on the spatiotemporal data, and processes queries based on the spatiotemporal data. For example, temporal data may be collected from vehicles representing trips conducted by the vehicles or sensor data mounted on the vehicles travelling in a region. Each data point may

```
--- single range
- 31 days, 31 document process, 2,678,400 data points
--- SELECT [ STR_TO_MILLIS("2023-05-01T13:30:00Z"), STR_TO_MILLIS("2023-
05-31T20:00:00Z")];
\ set -$ts_ranges [ 1682947800000, 1685563200000] ;
CREATE INDEX ix1 ON docs(ticker, ts_end, ts_start);
SELECT MILLIS_TO_TZ(day*864000000, "UTC") AS day ,
    dayavg,
    AVG(dayavg) over (ORDER BY day ROWS 7 PRECEDING) as
    sevendaymovavg
FROM ts.sl.c2 AS d
UNNEST _timeseries(d, { "t_ranges" :$ts_ranges} ) AS
WHERE d.ticker = 'GOOG'
AUD (d. s_start <= $ts_ranges[1] AND d.ts_end >= $ts_ranges[0])
GROUP BV IDIV(t._t, 86400000) AS day
LETTING dayavg - AVG(t._v0);
```

Process

FIG. 3 is a flowchart of one embodiment of a method for retrieving items for a query using an embedding for the query, item embeddings, and one or more attributes of the items. In various embodiments, the method includes different or additional steps than those described in conjunction with FIG. 3. Further, in some embodiments, the steps of the method may be performed in different orders than the order described in conjunction with FIG. 3. The method described in conjunction with FIG. 3 may be carried out by the database system 102 in various embodiments.

The database system 110 stores 310 a time series in a plurality of documents. The time series includes a series of data points indexed in time order, and each of the plurality of documents stores a subset of the series of data points in time order. The database system 110 stores 320, for each of the plurality of documents, as metadata in the document, a time range of the subset of the series of data points. For specify the time value associated with the time of the data as well a spatial value identifying the location from which the data was sent.

The system allows querying the data based on constraints that include spatial constraints as well as temporal constraints. The system may receive and process a query requesting information describing vehicles within a region that travelled within a give time interval. For example, the query may request information describing all vehicles that travelled within a neighborhood on a particular day. The query may select specific attributes of the vehicles, or may group the data based on specific attributes, or may further filter the data. For example, the query may request all vehicles that travelled within a county within a time interval, grouped by zip code or grouped by car manufacturers, or filtered by specific attribute such as an attribute describing the drivers, assuming the information is stored in the document database. Although these examples are based on vehicles, the techniques apply to any type of entity that may be represented using the document database, for example, robots, devices, sensors, people, and so on that have spatial and/or temporal attributes that can be collected.

An example query may compute the concentration of certain entities within an area represented by a particular geometric shape, and within a time interval. Note that the documents store both spatial and temporal data, and the queries may be based on only spatial constraints, only temporal constraints, or both spatial and temporal constraints (also referred to as spatiotemporal constraints).

An example document may store a document key, location data, temporal data and other attributes. For example, the document {"3RJA043:d1" {"loc": [37.580256, −121.993664], "time": "2021-10-02T10:10:30Z", "velocity ": 32.34," temperature ": 87.2}} has "3RJA043:d1" as document key, "loc" as location attribute (spatial data), "time" as time series data (temporal attribute) and "velocity" and "temperature" as the data values (e.g., velocity and temperature of a vehicle at the given location and time.

Conventional systems perform poorly when processing such queries since the amount of data increases very rapidly. For example, even if a vehicle is not moving, the vehicle may continue sending data since time value continued to change and time series data continues to be generated. Storing such large amount of data is expensive in terms of storage and processing the data is expensive in terms of computational power required for indexing and processing queries based on the data.

According to an embodiment, the system uses a geohash value based on the latitude and longitude specified for a data point. The geohash is a base-32 number generated from a pair of latitude and longitude. For example, the geohash of latitude, longitude pair of 37.7749, −122.4194 is 9q8yyk8ytpxr. The number of digits in the geohash determine the accuracy of the region represented by the geohash. For example, 12 digits of geohash for a region provide an accuracy of 1.5 cm×3 cm of the region. The number of digits of the geohash may be changed to change the precision of the location. For example, removing some of the least significant digits of the geohash results in a larger region and adding one or more digits in the least significant position increases the precision by allowing the system to represent smaller regions.

FIG. 4 illustrates the use of geohash to represent a spatial region, according to an embodiment. The region 410 represents a region represented by a geohash value, for example, H1. The region may be subdivided into 32 subregions, each corresponding to one of the 32-base digits. By adding a digit to the geohash value H1 in the least significant position, a new geohash value is obtained that refers to one of the sub-regions. By adding the digit 't' to the geohash value H1 in the least significant position, a new geohash value can be obtained that refers to the sub-region 415. The precision of the spatial regions can be increased by increasing the number of digits of the geohash, for example, to represent the region 420.

The system stores spatial data using geohash values and stores temporal data as milliseconds. Accordingly, both spatial data and temporal data is represented as integers. The system stores the spatial data and temporal data as fields of a document. For example, the system may store each data point as a document storing a document key, a geohash value for a spatial location, a time value, and one or more other attributes such as "vel" (for storing velocity) and "temp" (for storing temperature).

```
"3RJA043:d1" {"loc": [ 37. 580256, −121.993664], "time": "2021-10-02T10:10:30Z",
"vel":32.34, "temp": 87.2]
"3RJA043:d1" {"loc": [ 37. 580569, −121.995257], "time": "2021-10-02T10:10:50Z",
"vel":30.54, "temp": 84.6]
"3RJA043:d1" {"loc": [ 37. 580782, −121.996319], "time": "2021-10-02T10:11:23Z",
"vel":33.35, "temp": 85.9]
"3RJA043:d1" {"loc": [ 37. 581912, −122.001834], "time": "2021-10-02T10:12:38Z",
"vel":37.65, "temp": 83.4]
```

Storing a separate document for each data point requires large amount of storage and also results in large indexes, if an index is created based on spatiotemporal fields. According to an embodiment, the system stores multiple spatiotemporal values in each document using arrays. Accordingly, the system stores documents in which a single field stores multiple tuples as an array, each tuple comprising a number corresponding to a geohash value representing spatial data, another number corresponding to a time value, and one or more additional attributes for that particular spatial location and time. Following is an example of such a document storing data as an array.

```
docid: "vehicle:3RJA043:20230525:v0_g9"
{
  "ts_data": [
    ["9q8yyyyyb", 1634942482948, 32.34],
    ["9q8yyyyyl", 1634943429481, 32.54],
    ["9q8yyyyyg", 1634944828723, 33.34],
    ["9q8yyyyzc", 1634945827232, 34.92],
    ["9q8yyyyzd", 1634946283721, 33.82],
    ["9q8yyyyzz", 1634947359421, 32.89],
    ...
  ]
  "sp_low" : "9q8yyyyyb",
  "sp_high": "9q8zyxybc",
  "ts_low" : 1634942482948,
  "ts_high": 1634982892948,
  "info": {"bought": "2021-07-22", "address"; " ... "},
  "vehicle": "3RJA043"
}
```

Storing the attributes as an array provides storage efficiency and allows large number of data points to be stored efficiently within a single array. The document further stores metadata representing the range of geohash values for spatial data, for example, by storing a low geohash value $G_L$ and a high geohash value $G_H$ such that all data points have spatial values within the range $G_L$ and $G_H$. The document also stores metadata representing the range of time values for the timeseries data, for example, by storing a low time value $T_L$ and a high time value $T_H$ such that all data points have spatial values within the range $T_L$ and $T_H$. The document may store additional metadata.

The system creates indexes based on the spatiotemporal data. The system may create multiple indexes. For example, the system may create a spatiotemporal index based on the range of spatial data of each document and the range of temporal data in each document. Accordingly, this index is created based on the attributes $G_L$, $G_H$, $T_L$, and $T_H$, i.e, the index is created over the metadata stored in each document representing the lower bound of the spatial data stored in the document, the upper bound of the spatial data stored in the document, the lower bound of the temporal data stored in the document, the upper bound of the temporal data stored in the document. This spatiotemporal index allows searching for documents that store a data point representing a particular spatial and temporal value. The index identifies the document that stores the particular data point or a range or set of data points. The system uses a UDF for identifying specific values of the data point from the array storing the spatiotemporal data in the document. This approach allows the spatiotemporal data to be filtered using both spatial and time filters together using a single index. Furthermore, the spatiotemporal index can be based on data skew. According to some embodiments, the spatial (geohash) range is the leading key in the spatiotemporal index and in other embodiments, time range is the leading key in the spatiotemporal index.

The system may create other indexes. For example, the system may create a spatial index based on only the spatial range of each document. Accordingly, the spatial index is created based on the attributes $G_L$, $G_H$, i.e., the spatial index is created over the metadata stored in each document representing the lower bound of the spatial data stored in the document and the upper bound of the spatial data stored in the document. This spatial index allows searching for documents based on only spatial constraints, for example, all data points within a particular region independent of their time value.

As another example, the system may create a temporal index based on the temporal range of each document. Accordingly, the temporal index is created based on the attributes $T_L$, $T_H$. i.e., the temporal index is created over the metadata stored in each document representing the lower bound of the temporal data stored in the document and the temporal bound of the spatial data stored in the document. This temporal index allows searching for documents based on only temporal constraints, for example, all data points within a time range, independent of their spatial location.

Figure 5:
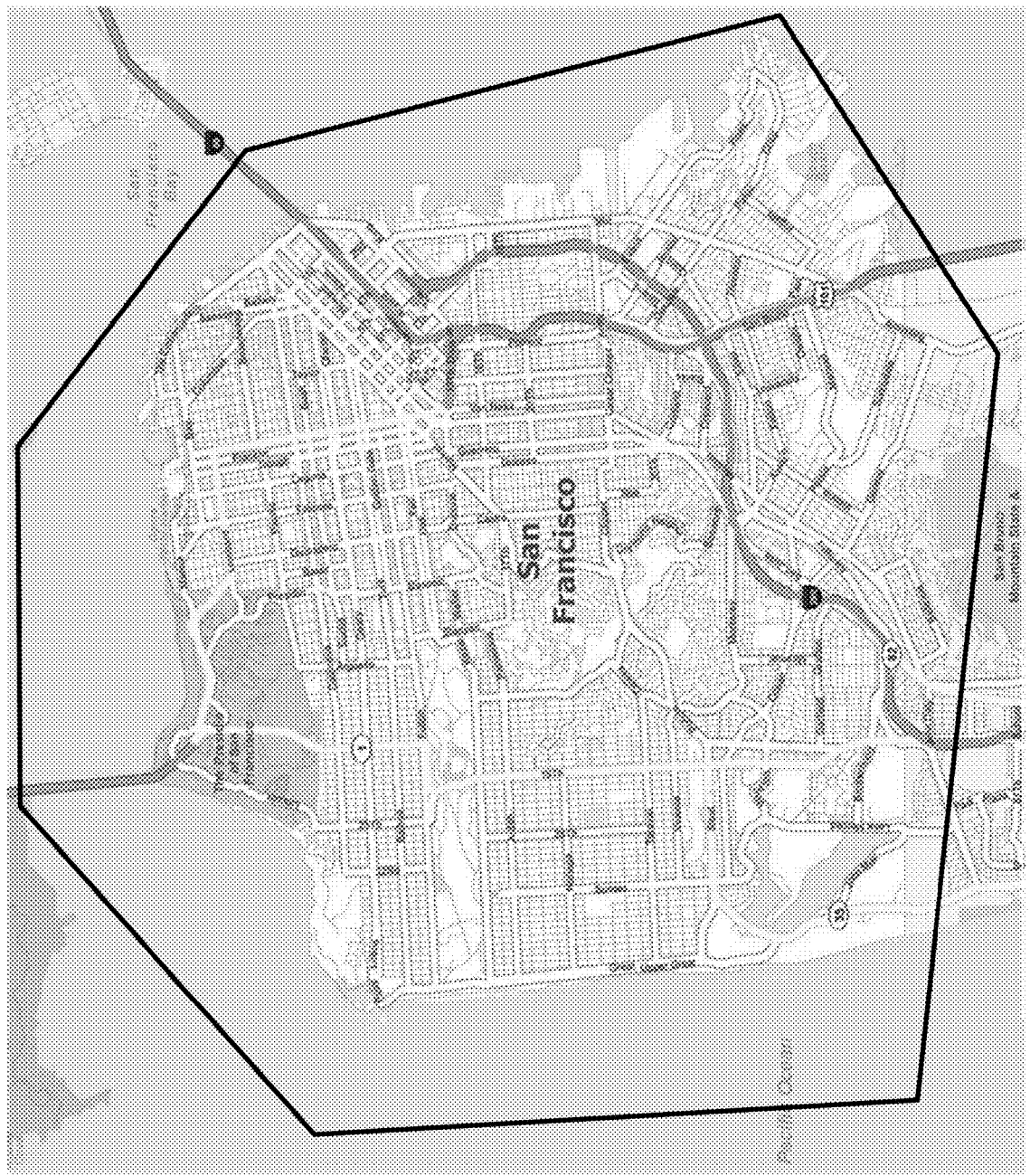
FIG. 5 illustrates a geometric shape such as a polygon used for identifying a region, for example, San Francisco, according to an embodiment.

According to an embodiment, the system receives a query that specifies a geometric shape, for example, a polygon and further specifies a time range for processing all data points that have spatial coordinates within the geometric shape and the time value within the time range. FIG. 5 illustrates a geometric shape such as a polygon used for identifying a region, for example, San Francisco, according to an embodiment.

The system executes a query that includes a spatial constraint based on a geohash range and a temporal constraint based on the time range. The system uses the spatiotemporal index to identify the set of documents containing data points based on the spatial constraint and the temporal constraint and uses a UDF to identify specific set of data points from each document by iterating through the arrays stored in each document to check if each individual data point satisfies the spatial constraint and the temporal constraint.

Figure 6:
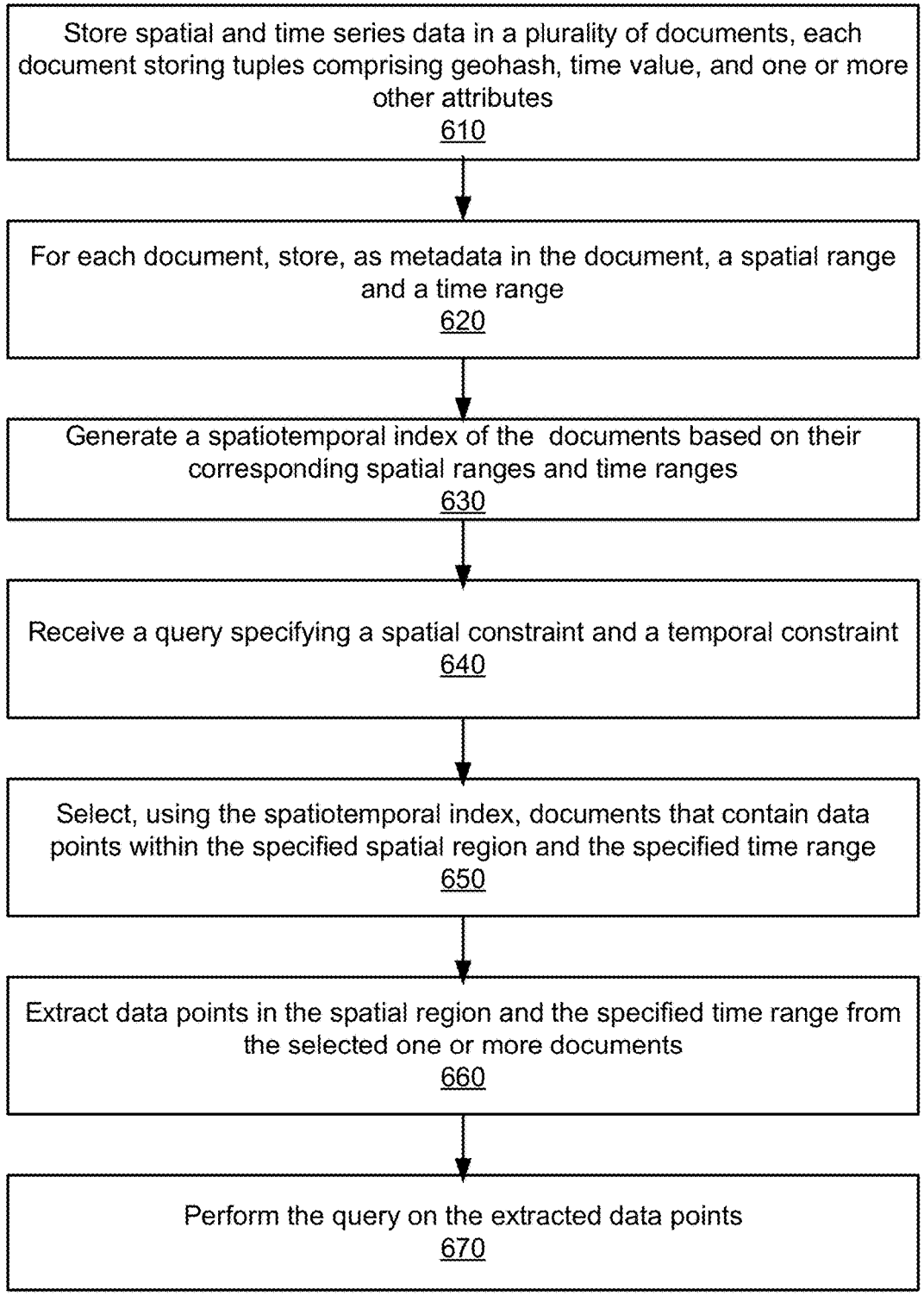
FIG. 6 is a flowchart of one embodiment of a method for indexing and querying spatiotemporal data, indexing and querying spatiotemporal data.

FIG. 6 is a flowchart of one embodiment of a method for indexing and querying spatiotemporal data, indexing and querying spatiotemporal data. In various embodiments, the method includes different or additional steps than those described in conjunction with FIG. 3. Further, in some embodiments, the steps of the method may be performed in different orders than the order described in conjunction with FIG. 3. The method described in conjunction with FIG. 3 may be carried out by the database system 102 in various embodiments.

The database system 110 stores 610 spatiotemporal data comprising spatial data and time series data in a plurality of documents. Each of the plurality of documents stores a subset of the spatiotemporal data. Each document stores documents storing arrays of tuples, each tuple including a geohash representation of spatial data, a time value, and one or more attributes. The database system 110 stores 620, for each of the plurality of documents, as metadata in the document, a spatial range represented by a low geohash value and a high geohash value and a time range comprising a low time value and a high time value. The data points stored in the document have geohash values that are within the spatial range and time values within the time range.

The database system 110 generates 630 a spatiotemporal index of the plurality of documents based on their corresponding spatial ranges and time ranges. Since each document stores an array representing a large number of points, the spatiotemporal index is small compared to the number of data points since it only indexes documents.

The database system 110 receives 640 a query associated with one or more data points. The query specifies a spatial constraints and a time constraints. For example, the query may process data points within a particular spatial range and time range. The database system 110 selects 650, based on the spatiotemporal index, one or more documents from the plurality of documents that contain data points in the particular spatial range and time range. The database system 110 extracts 660 data points in the particular spatial range and time range from the selected one or more documents by executing the UDF that processes the arrays of the one or more documents. The database system 110 performs 670 the query on the extracted data points.

Accordingly, the techniques disclosed herein are used for storing and querying spatiotemporal data. The techniques disclosed provide improvement in storage efficiency as well as improvement in computational efficiency in processing queries with spatiotemporal constraints. Following table shows improvements based on experimental and analytical observations. The column "Model-Before" shows the performance based on conventional techniques, the column "Model-After" shows performance of a system using the techniques disclosed herein, and the column "Improvement (saving)" shows the performance improvement of the disclosed technique as a percentage compared to a system that does not implement the techniques disclosed herein.

| Measurements | Model-Before | Model-After | Improvement (saving) |
| --- | --- | --- | --- |
| Number of documents | 711,472 | 1709 | 99.99% |
| Size of the data | 341 MB | 13.42 MB | 96% |
| Index entries (per index) | 711,472 | 1709 | 99.09% |

As shown in the above table, the techniques disclosed achieved 99.99% improvement in the number of documents stored by storing data in arrays within each document; achieved 96% improvement in storage (size of data stored) by storing data in arrays instead of separate documents; and achieved 99.09% improvement in the number of index entries per index by indexing documents storing arrays instead of individual documents storing data points separately. The user of the spatiotemporal index allows the appropriate documents to be accessed fast, thereby providing the improvement in computational efficiency.

Accordingly, the techniques disclosed provide flexibility of languages such as structured query language (SQL) for querying the document database and representations such as JSON (JavaScript Object Notation) while using a small storage footprint. The data storage footprint can further be reduced by compression techniques like delta compression or other compression techniques or a combination of these. Since the UDF (user defined function) performs the post index scan filtering, the UDF can be coded to handle any suitable compression technique.

Computer Architecture

Figure 7:
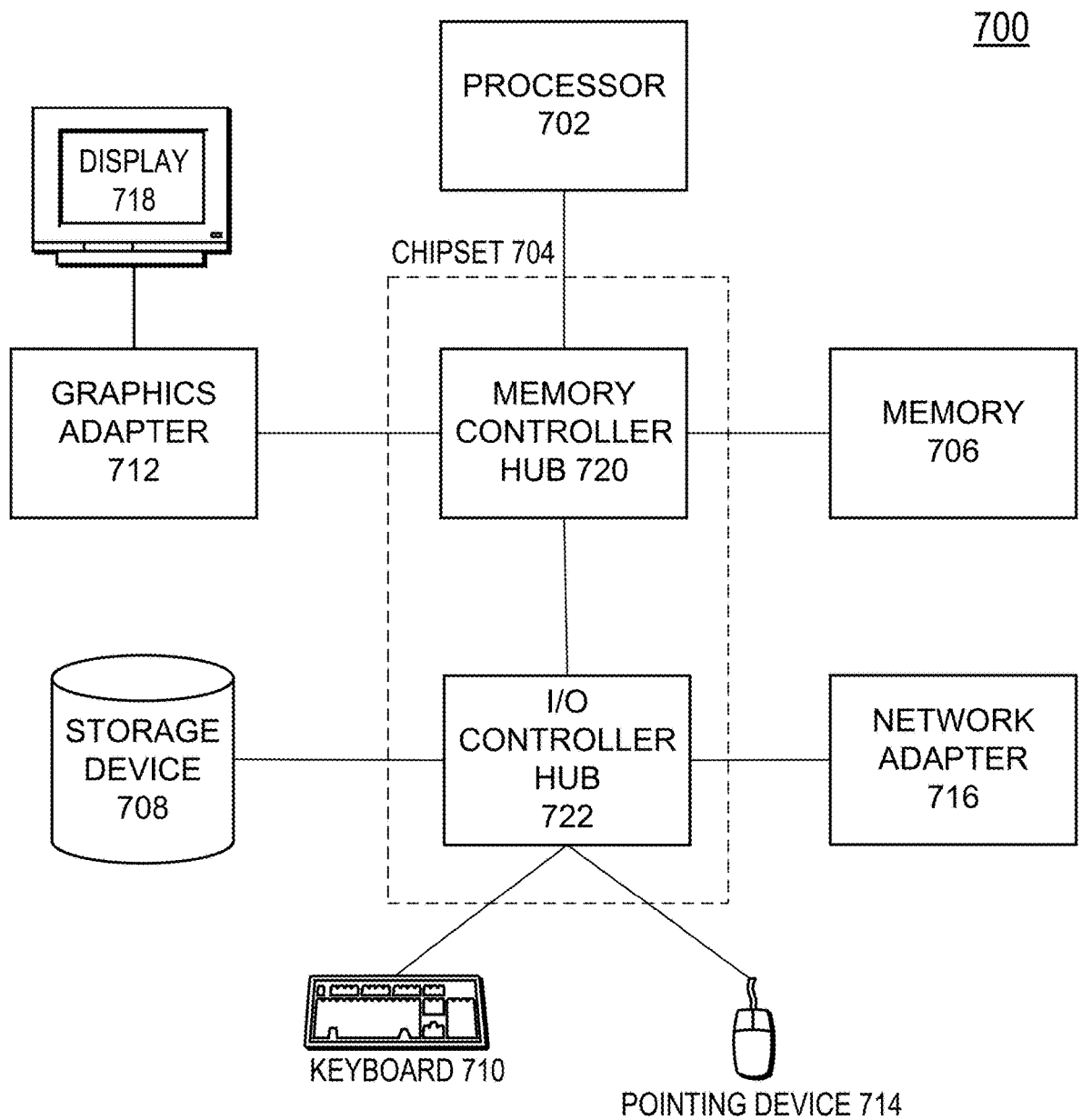
FIG. 7 is a high-level block diagram illustrating a functional view of a typical computer system for use as one of the entities illustrated in the system environment of FIG. 1 according to an embodiment.

FIG. 7 is a high-level block diagram illustrating a functional view of a typical computer system for use as one of the entities illustrated in the system environment of FIG. 1 according to an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a network.

As is known in the art, a computer system 700 can have different and/or other components than those shown in FIG. 7. In addition, the computer system 700 can lack certain illustrated components. For example, a computer system 700 acting as a server (e.g., a query server 112) may lack a keyboard 710 and a pointing device 714. Moreover, the storage device 708 can be local and/or remote from the computer system 700 (such as embodied within a storage area network (SAN)).

The computer system 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1008, loaded into the memory 706, and executed by the processor 702.

The types of computer systems 700 used by the entities of FIG. 1 can vary depending upon the embodiment and the processing power used by the entity. For example, a client device 120 may be a mobile phone with limited processing power, a small display 718, and may lack a pointing device 714. The entities of the distributed database system 110, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A method for querying data stored in a document store:
for each of a plurality of documents, storing, as metadata in the document, a time range of a plurality of data points stored in the document, wherein each of the plurality of documents further stores a spatial range of geohashes for the data points stored in the document, the spatial range of geohashes stored as (1) a spatial start field describing a start geohash value, and (2) a spatial end field describing an end geohash value;
generating an index of the plurality of documents, the index configured to access a document based on the time range of the document;
receiving a query associated with one or more data points, the query specifying a time constraint representing a particular time range; and
responsive to receiving the query, processing the query comprising:
selecting, based on the index, one or more documents from the plurality of documents that contain data points in the particular time range;
extracting data points in the particular time range from the selected one or more documents; and
performing the query on the extracted data points.

2. The method of claim 1, wherein in each document of the plurality of documents, the document storing a plurality of data points, the time range of the plurality of data points is stored as (1) a time start field describing a start time of the plurality of data points, and (2) a time end field describing an end time of the plurality of data points.

3. The method of claim 1, wherein the data points are stored as an array in each of the plurality of documents, and extracting data point includes unnesting a subset of data points from the array.

4. The method of claim 3, wherein the query invokes a function to process the array storing the data point in a particular document, wherein the function generates an object for each data point for processing by the query.

5. The method of claim 4, wherein the function is a user defined function specified in a language distinct from the language used to specify the query, wherein the user defined function transforms data values of data points stored in a document.

6. The method of claim 4, wherein the function selects a subset of data points of the array based on a filter condition of the query.

7. The method of claim 2, further comprising:
receiving a new data point;
appending the new data point to a last data point in a last document in the plurality of documents; and
updating the time end field of the last document based on the new data point.

8. The method of claim 1, wherein the query specifies a where clause that filters data points by a time range, the time range specified using a start time and an end time.

9. The method of claim 1, wherein the query further specifies a spatial constraint that filters the data points by a spatial range, the spatial range specified using a start geohash value and an end geohash value, wherein the one or more documents selected based on the index contain data points within the spatial range.

10. A non-transitory computer readable storage medium, storing instructions that when executed by one or more computer processors cause the one or more computer processors to perform steps of a method for querying data stored in a document store, the steps comprising:
for each of a plurality of documents, storing, as metadata in the document, a time range of a plurality of data points stored in the document, wherein each of the plurality of documents further stores a spatial range of geohashes for the data points stored in the document, the spatial range of geohashes stored as (1) a spatial start field describing a start geohash value, and (2) a spatial end field describing an end geohash value;
generating an index of the plurality of documents, the index configured to access a document based on the time range of the document;
receiving a query associated with one or more data points, the query specifying a time constraint representing a particular time range; and
responsive to receiving the query, processing the query comprising:
selecting, based on the index, one or more documents from the plurality of documents that contain data points in the particular time range;
extracting data points in the particular time range from the selected one or more documents; and
performing the query on the extracted data points.

11. The non-transitory computer readable storage medium of claim 10, wherein in each document of the plurality of documents, the document storing a plurality of data points, the time range of the plurality of data points is stored as (1) a time start field describing a start time of the plurality of data points, and (2) a time end field describing an end time of the plurality of data points.

12. The non-transitory computer readable storage medium of claim 10, wherein the data points are stored as an array in each of the plurality of documents, and extracting data point includes unnesting a subset of data points from the array.

13. The non-transitory computer readable storage medium of claim 12, wherein the query invokes a function to process the array storing the data point in a particular document, wherein the function generates an object for each data point for processing by the query.

14. The non-transitory computer readable storage medium of claim 13, wherein the function is a user defined function specified in a language distinct from the language used to specify the query, wherein the user defined function transforms data values of data points stored in a document.

15. The non-transitory computer readable storage medium of claim 11, wherein the instructions further cause the one or more computer processors to perform steps comprising:

receiving a new data point;

appending the new data point to a last data point in a last document in the plurality of documents; and updating the time end field of the last document based on the new data point.

16. The non-transitory computer readable storage medium of claim 10, wherein the query specifies a where clause that filters data points by a time range, the time range specified using a start time and an end time.

17. The non-transitory computer readable storage medium of claim 10, wherein the query further specifies a spatial constraint that filters the data points by a spatial range, the spatial range specified using a start geohash value and an end geohash value, wherein the one or more documents selected based on the index contain data points within the spatial range.

18. A computer system comprising:

one or more computer processors; and a non-transitory computer readable storage medium storing instructions that when executed by one or more computer processors cause the one or more computer processors to perform steps of a method for querying data stored in a document store, the steps comprising:

for each of a plurality of documents, storing, as metadata in the document, a time range of a plurality of data points stored in the document, wherein each of the plurality of documents further stores a spatial range of geohashes for the data points stored in the document, the spatial range of geohashes stored as (1) a spatial start field describing a start geohash value, and (2) a spatial end field describing an end geohash value;

generating an index of the plurality of documents, the index configured to access a document based on the time range of the document;

receiving a query associated with one or more data points, the query specifying a time constraint representing a particular time range; and responsive to receiving the query, processing the query comprising:

selecting, based on the index, one or more documents from the plurality of documents that contain data points in the particular time range;

extracting data points in the particular time range from the selected one or more documents; and performing the query on the extracted data points.

\* \* \* \* \*